United States Patent [19]
Shum et al.

[11] 3,872,285
[45] Mar. 18, 1975

[54] CONTROL SYSTEM FOR SENSING THE VIBRATION AND LATERAL FORCE ON A CUTTING TOOL

[75] Inventors: Lanson Y. Shum, Delmont; Leon J. Sienkiewicz, Export; Theodore Gogniat, Monroeville, all of Pa.

[73] Assignee: Westinghouse Electric Corporation, Pittsburgh, Pa.

[22] Filed: May 31, 1974

[21] Appl. No.: 475,235

[52] U.S. Cl. .......... 235/151.11, 73/104, 235/151.3, 90/11 A
[51] Int. Cl. ..................... B23g 11/04, G05b 11/10
[58] Field of Search .............. 340/267 R; 73/104; 235/151.3, 151.11

[56] References Cited
UNITED STATES PATENTS

| | | | |
|---|---|---|---|
| 3,596,506 | 8/1971 | Wilson, Jr. | 73/133 |
| 3,714,822 | 2/1973 | Lutz | 73/104 |
| 3,819,916 | 6/1974 | Watanabe | 235/151.11 |
| 3,836,834 | 9/1974 | Abbatiello et al. | 318/563 |

*Primary Examiner*—Eugene G. Botz
*Attorney, Agent, or Firm*—J. J. Wood

[57] ABSTRACT

A system for sensing the vibration and lateral force in a cutting tool for the purpose of keeping both these operating parameters within tolerable limits. A piezoelectric crystal is mounted in the chuck supporting the cutting tool. The mechanical stresses on the crystal produce an electrical signal which is then separated into vibration and lateral force components. The negative d.c. analog voltages of these components are summed with a positive d.c. voltage analogous to the programmed feed rate, the algebraic summation resulting in an adaptive control voltage which is used to modulate the spindle power in accordance with the ambient vibration and force.

5 Claims, 2 Drawing Figures

CONTROL SYSTEM FOR SENSING THE VIBRATION AND LATERAL FORCE ON A CUTTING TOOL

BACKGROUND OF THE INVENTION

1. Field of the Invention

This invention relates to a control system for sensing the vibration and lateral force on a cutting tool for the purpose of keeping both these parameters within tolerable limits.

2. Description of the Prior Art

The adaptive control technique for numerically controlled machine tools contemplates the maintenance of optimum spindle power consonant with environmental conditions. As with any control system, efficacy depends upon the accuracy of measurement of the relevant parameters.

The prior art has recognized the importance of determining tool deflection. One known expediency has been to mount strain gages onto the spindle of the machine. Since the spindle is rotating the signals must be modulated and transmitted to a stationary control by means of rotary transformers. Such a system suffers from at least two disadvantages. First, the spindle of the machine must be reworked to receive the strain gages — this can be quite expensive. Secondly, since the spindle deflection is measured, the transducer dynamic sensitivity and range are limited to one. Since the transducer is relatively remote from the cutting tool, it may not be sensitive enough to measure low lateral forces for small diameter cutting tools.

U.S. Pat. No. 2,978,689 entitled "Control Mechanism for Machine Tools and the Like" invented by K. O. Tech et al. teaches the use of a pressure transducer to determine the force on a cutting tool for the purpose of controlling the sharpness of the cutting tool. As the tool becomes dull, more pressure is required and this increases the reactive force on the transducer.

The Tech patent teaches that the transducer should advantageously be placed so that the force on the cutting tool produces a reactive force on the transducer which is normal to its face.

The instant invention contemplates using a pressure transducer positioned so as to measure the vibration and lateral forces on a cutting tool. These component forces are developed and an adaptive control signal is derived for the purpose of continuously monitoring the vibrational and lateral bending forces on the cutting tool.

SUMMARY OF THE INVENTION

The invention relates to a control system for sensing the vibration and lateral force on a cutting tool supported in a chuck mounted on a machine. A transducer means, responsive to mechanical force to produce electrical signals, is mounted in proximity to the cutting tool. Means are coupled to the transducer means for separating the electrical signals into vibration and lateral force components. Summing means receive these component signals as dc signals of one polarity, and sum them with a programmed feed rate reference dc signal of opposite polarity, the algebraic summation resulting in an adaptive control signal which is continuously modulated in accordance with the instantaneous vibration and force experienced by the cutting tool.

DESCRIPTION OF THE PREFERRED EMBODIMENT

Figure 1:
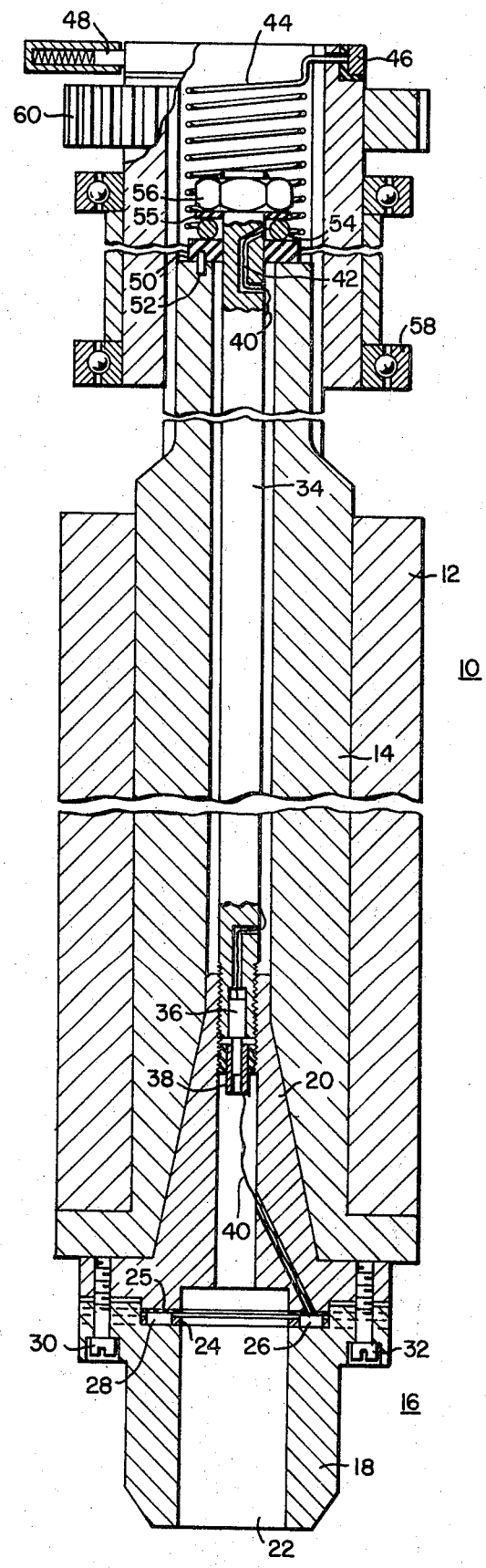
FIG. 1 is a cross sectional view of the vibration and lateral force sensing means in accordance with the invention.

Referring now to FIG. 1, the cutter lateral force sensing means of the invention is indicated generally at 10; the assembly is mounted on a milling machine the details of which will not be shown in the interests of simplicity. A quill 12 is arranged to receive a spindle 14 which is internally tapered to receive a chuck indicated generally at 16. The chuck 16 comprises two parts, a changeable tool holder 18 and a tapered portion 20 which fits within the tapered end of the spindle 14. A cutting tool not shown is suitable mounted within the bore 22. A transducer ring 24 is positioned in a recess milled in the tool holder portion 18 as shown. The ring 24 contains four holes, in one of which a piezoelectric crystal 26 is mounted; in the other three holes dummy spacers are placed, only one of which is shown at 28. The tool holder part 18 and the tapered part 20 are bolted together by means of four bolts, two of which are identified at 30 and 32. The bolts are tightened so as to produce a predetermined loading on the piezoelectric crystal 26.

Figure 2:
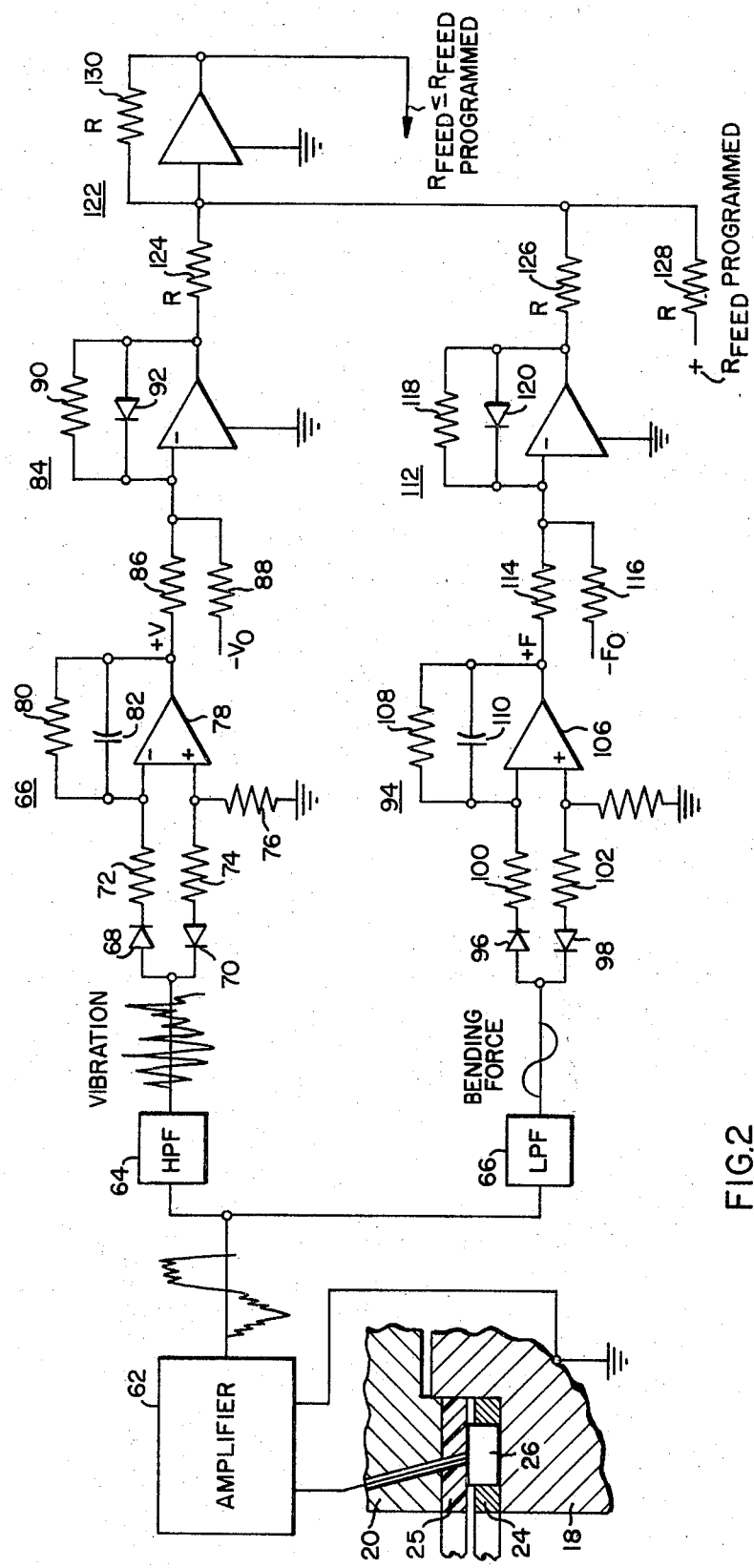
FIG. 2 is an electrical schematic of the control system in accordance with the invention for developing an adaptive control signal which is continuously modulated by the instantaneous vibration and force experience by the cutting tool.

A draw bar 34 passes through the central bore of the spindle 14 to secure to the chuck 16; the end portion of the draw bar 34 contains a plug 36 having an electrical socket at 38 to which is attached a wire 40 connected to one electrode of the piezoelectric crystal 26, the other electrode of which is grounded to the chuck 16. As shown in FIG. 2, the upper electrode is electrically isolated from the chuck 16 by means of insulator 25.

The wire 40 passes up through a small bore 42 in the upper end of the draw bar 34. A spiral conductor 44 is connected at one end to a slip-ring 46. A carbon brush 48 makes electrical contact with the slip ring 46.

An insulating washer 50 is secured to the spindle 14 by means of a spline 52. The other end of the spiral conductor 44 is secured to the wire 40 by means of a brass ring 54. A nut 56, welded to the draw bar 34 is separated from the brass ring 54 by means of an insulator 55.

Completing the description a bearing is identified at 58. Rotary displacement is imparted to the cutting tool by means of driving gear 60.

The signal from the piezoelectric crystal 26 is applied to an amplifier 62. The output of the amplifier 62 is applied to a high pass filter 64 and to a low pass filter 66.

The output of the high pass filter 64 is applied to a full wave rectifier, filter-variable gain circuit, indicated generally at 66, and comprising diodes 68, 70 input resistors 72, 74, 76 an amplifier indicated symbolically at 78, and an RC feedback comprising a resistor 80 and a capacitor 82 in parallel.

The output of circuit 66 is applied to an inverting amplifier 84, having input resistors 86, 88 and a parallel feedback circuit comprising resistor 90 and diode 92 poled as shown.

The output of the low pass filter 66 is applied to a full wave rectifier-filter-variable gain circuit indicated generally at 94 and comprising diodes 96, 98, input resistors 100, 102, 104, an amplifier indicated symbolically at 106 and an RC feedback comprising resistor 108 and a capacitor 110 in parallel.

The output of circuit 94 is applied to an inverting amplifier 112 having input resistor 114, 116 and a parallel feedback circuit comprising a resistor 118 and a diode 120 poled as shown.

The outputs of the inverting amplifiers 84 and 112 are fed to a summing amplifier indicated generally at 122 through resistors 124 and 126. Amplifier 122 also includes input resistor 128 and feedback resistor 130.

OPERATION

As is well known certain crystals (piezoelectric) experience a separation of electrical charge when mechanical stresses are suitably applied. Because the separation of charge results in an increase in electrical energy in the crystal dielectric, a conversion of energy from mechanical to electrical is accomplished.

Positioned as it is so close to the cutting tool, the crystal 26 experiences mechanical forces resulting from the impact of the cutting tool on the workpiece as well as from the vibration of the machine.

The complex voltage waveform received from the crystal 26 is therefore a function of vibration as well as force. The high and low pass filters 64, 66 respectively separate out the high frequency and low frequency components.

The high frequency signal from the high pass filter 64 is rectified, filtered and amplified by the circuit 66 to produce a dc voltage (0 to +10 volts) which is a function of the vibration. A reference voltage −Vo (which corresponds to the upper limit of vibration tolerance) is applied to the input of amplifier 84 which also receives +V (0 to +10 volts) an analog signal which is a function of the instantaneous vibration. The reference voltage −Vo is summed with +V the instantaneous vibration voltage to produce an inverted output i.e. a negative dc signal at the output of the inverter 84.

The output of the low pass filter 66 is a sine wave of varying amplitude, the instantaneous force being a function of the magnitude of the sine wave. The output of the circuit 94 is an analog signal +F (0 to +10V) which is a function of the lateral force in the cutter. A reference voltage −Fo which is a voltage analogous to the maximum permissible force on the cutting tool, is applied to the inverting circuit 112.

The reference voltage −Fo is summed with +F the instantaneous lateral force voltage to produce an inverted output i.e. a negative dc signal at the output of circuit 112.

A voltage +R feed programmed is applied to the amplifier 120. This voltage is analogous to the voltage applied to the feed motor.

As vibration and force increase, these negative voltages −V, −F subtract from +R feed programmed. The output of amplifier 122 is +R feed programmed −V−F. This signal is then used in a power adaptive control loop to control the spindle power.

We claim as our invention:

1. A control system for sensing the vibration and lateral force on a cutting tool supported in a chuck mounted on a machine comprising:
    transducer means, mounted in proximity to said cutting tool, in response to mechanical force to produce electrical signals;
    means coupled to said transducer means for separating said electrical signals into vibration and force component signals;
    means for summing said vibration and force components with a programmed feed rate reference signal to produce a summed adaptive control signal which is continuously modulated in accordance with the instantaneous vibration and force experienced by the cutting tool.

2. A control system according to claim 1 wherein said transducer is a piezoelectric crystal mounted in said chuck.

3. A control system according to claim 1 wherein said separating means comprises a high pass filter and a low pass filter, said high pass filter delivering a high frequency vibration signal, said low pass filter delivering a low frequency lateral force signal.

4. A control system according to claim 1 wherein said separating means comprises a high pass filter, a low pass filter, and analog conversion means, said high pass filter delivering a high frequency vibration signal, said low pass filter delivering a low frequency lateral force signal, said conversion means receiving said high frequency vibration and said low frequency lateral force signals and delivering analog vibration and force signals to said summing means.

5. A control system for sensing the vibration and lateral force on a cutting tool supported in a chuck on a machine, comprising:
    at least one piezoelectric crystal mounted in said chuck, said crystal in response to mechanical force producing an electrical signal;
    means coupled to said piezoelectric crystal comprising a high pass filter, a low pass filter and conversion means, said high pass filter receiving said electrical signal and delivering a high frequency signal which is a function of vibration, said low pass filter receiving said electrical signal and delivering a low frequency lateral force signal, said conversion means receiving said high and low frequency signals, and delivering an analog vibration signal −V and an analog force signal −F; and
    summing means arranged to receive a reference signal +R which is a function of the programmed feed rate, and said vibration and force signals −V, −F respectively; whereby the algebraic summation of +R, −V, −F provides an adaptive control signal.

* * * * *